Sept. 8, 1936.   N. E. FLODIN ET AL   2,053,470
APPARATUS FOR MACHINING CYLINDRICAL SURFACES
Filed March 6, 1935   3 Sheets-Sheet 2
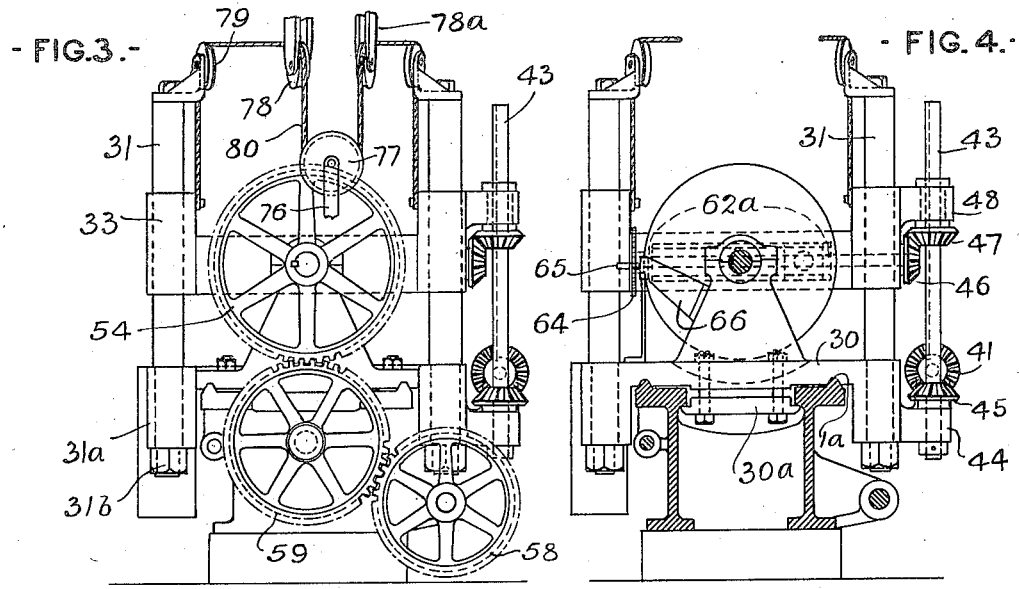
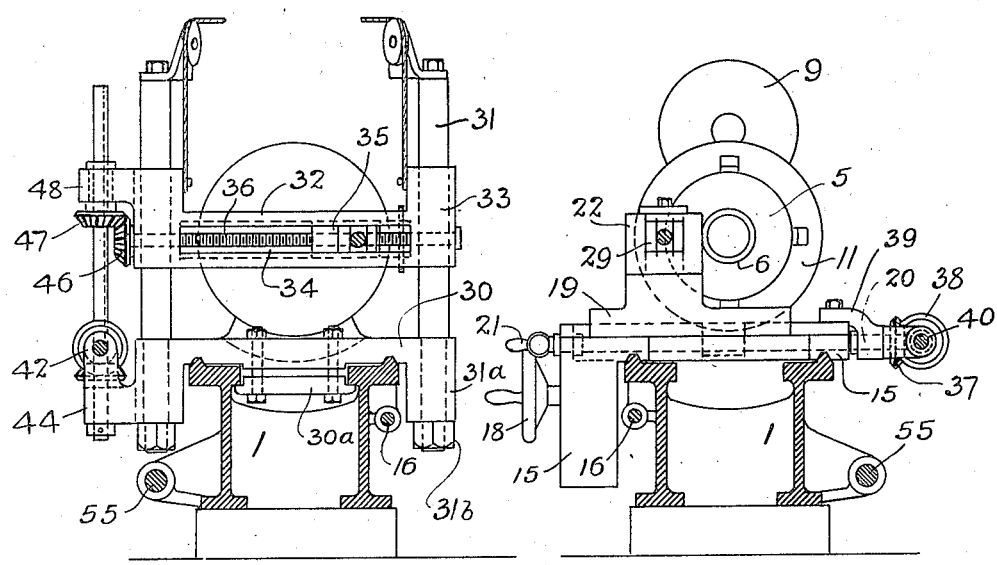
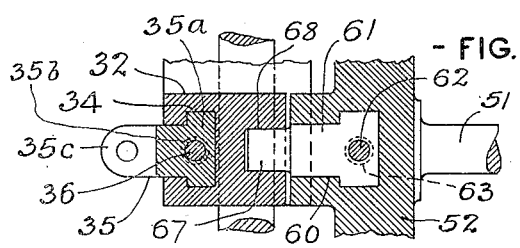
INVENTORS
Nels E. Flodin
John J. Eckfeldt, dec'd
BY Emma B. Eckfeldt, Executrix
ATTORNEY

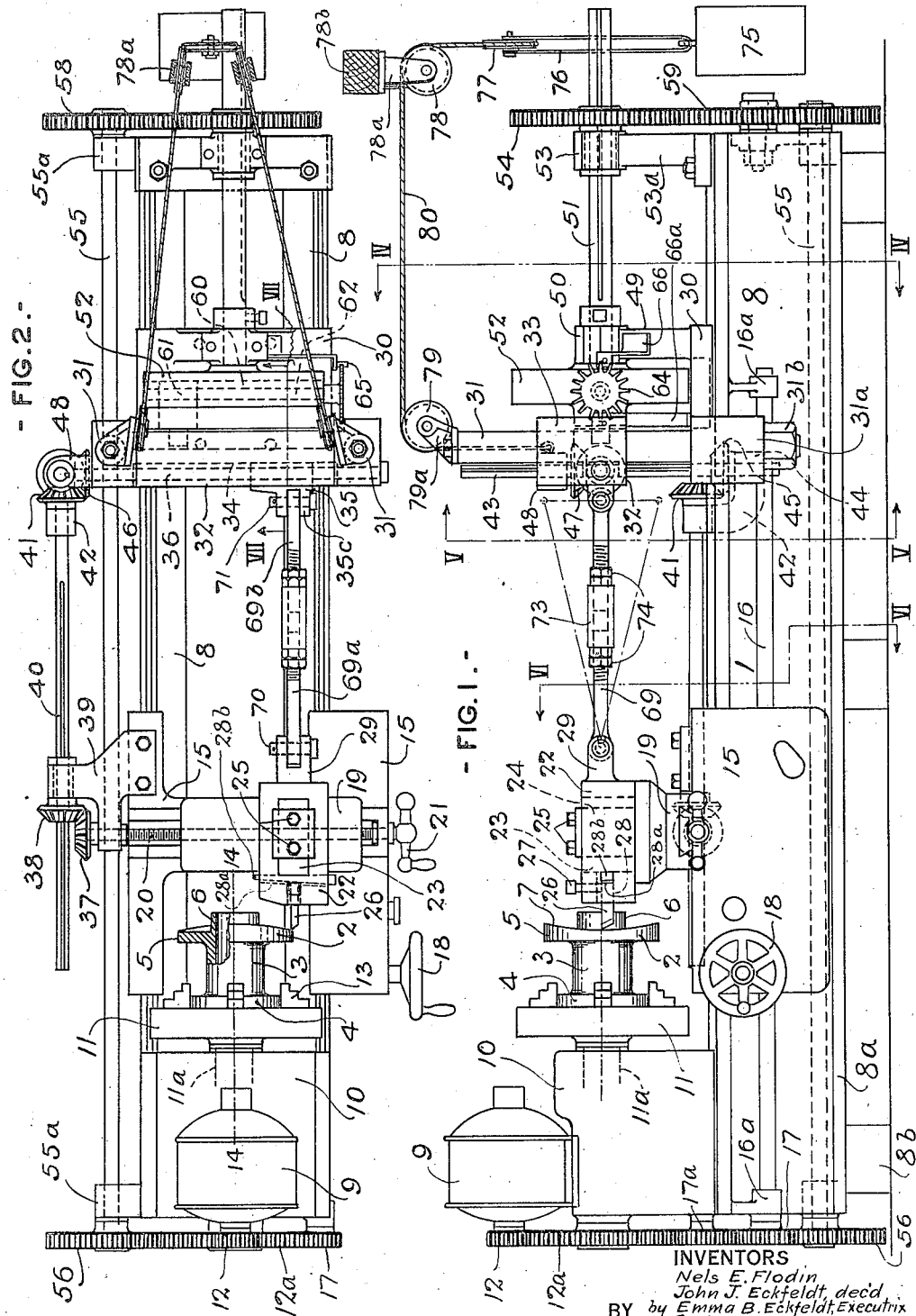

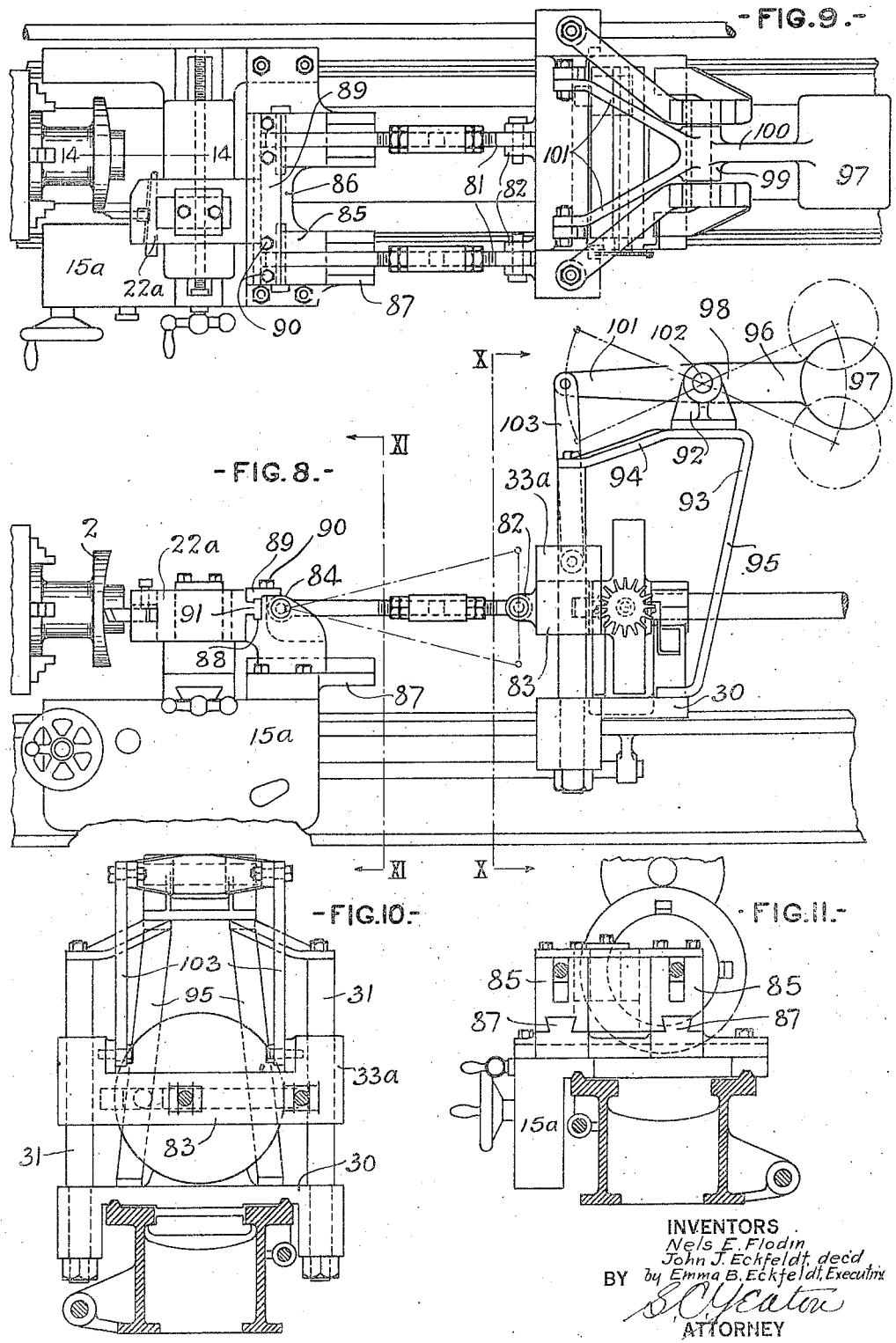

Patented Sept. 8, 1936

2,053,470

UNITED STATES PATENT OFFICE

2,053,470

APPARATUS FOR MACHINING CYLINDRICAL SURFACES

Nels E. Flodin, Latrobe, Pa., and John J. Eckfeldt, deceased, late of Chicago Heights, Ill., by Emma B. Eckfeldt, executrix, Chicago Heights, Ill., assignors to American Locomotive Company, New York, N. Y., a corporation of New York Application March 6, 1935, Serial No. 9,568

15 Claims.  (Cl. 82—11)

This invention relates to apparatus for machining cylindrical surfaces on metal pieces, as for instance the faces of the flanges of pipe nozzles and the like to adapt them for attachment as branches to other pipes, boiler shells, tank shells, or similar objects.

An object of the invention is to provide apparatus of the character described which is adapted for machining cylindrical surfaces of any desired radius.

A further object is to provide apparatus of the character described which is adapted to perform the machining operation by a continuous cutting operation.

A further object is to provide an engine lathe embodying a spindle and a tool holder adapted for axial and diametric movements relative to the spindle in such manner that an object rotated by the spindle will have a cylindrical surface of any desired radius machined thereon with its axis perpendicular to the axis of said spindle by a tool carried by the holder.

A further object is to provide apparatus of the character described which is applicable in connection with suitably modified lathes or boring, planing or milling machines of usual designs.

Other and further objects of and advantages achieved by this invention will be apparent from the following description of lathes embodying the invention.

In the accompanying drawings Figure 1 is a front elevation of an engine lathe embodying the present invention; Fig. 2 is a plan view of the lathe shown in Fig. 1, the roof girder being omitted and parts of the sheave bearings being broken away; Fig. 3 is a right end view of the lathe shown in Fig. 2 with the balance weight removed; Fig. 4 is a section on the line IV—IV of Fig. 1; Fig. 5 is a section on the line V—V of Fig. 1; Fig. 6 is a section on the line VI—VI of Fig. 1; Fig. 7 is an enlarged fragmentary section of the cross rail, wrist pin plate and certain parts associated therewith, on the line VII—VII of Fig. 2; Fig. 8 is a fragmentary front elevation of an engine lathe embodying the present invention with certain of the parts of modified form; Fig. 9 is a plan view of the parts of the lathe shown in Fig. 8; Fig. 10 is a section on the line X—X of Fig. 8; and Fig. 11 is a section on the line XI—XI of Fig. 8.

Referring in detail to the drawings and first particularly to Figs. 1 to 7 which illustrate the present preferred embodiment of the invention, the machining apparatus is here applied in connection with an ordinary engine lathe of usual design indicated generally by the numeral 1. The piece to be machined shown in the drawings is a nozzle 2. The nozzle is hollow and includes a body portion 3, a flat-faced flange 4 at one end thereof (the left end as viewed in the drawings), a flange 5 spaced from the flange 4 and an axially projecting neck 6 at its opposite end. The inner surface of the flange 5 is flat (although this surface may be curved and in fact, in practice, such surfaces are usually curved) and the outer surface is curved as indicated at 7. It is the surface 7 which the apparatus of the present invention is designed to machine and it will of course be understood that prior to the machining operation the piece to be machined, in the present instance the nozzle, preferably but not necessarily, will be roughly shaped substantially with its final desired curves including the curve of the surface 7.

Those parts of the lathe which are of ordinary well-known design will be briefly described for the purpose of giving a clear understanding of the invention and only those parts of the lathe comprising the apparatus of the present invention will be described in detail.

The lathe 1 includes a frame structure indicated generally by the numeral 8 including the usual beds 8a and base 8b. A driving motor 9 is carried on a head stock 10 of usual design which is suitably secured on the frame structure. Gears (not shown) within the head stock 10 are driven by the motor 9 through gears 12 and 12a. A chuck 11 is mounted on a spindle 11a which is driven by the gears of the head stock. The nozzle 2 is secured in the chuck 11 by suitable gripping means of usual design, indicated generally by the numeral 13, which engage the flange 4 of the nozzle with the axis of the nozzle, indicated generally by the line 14—14, coinciding with the axis of the spindle 11a. It will of course be understood that the invention is not limited to a rotatable spindle and that any like part by means of which the work can be revolved may be employed in place thereof, as will be the case when the invention is applied in connection with machines of certain other types than engine lathes.

The lathe is provided with a tool carriage 15 which is adapted for movement longitudinally of the lathe on suitable guideways. A shaft 16 is mounted in bearings 16a which are carried on the frame structure 8. The shaft 16 is adapted to be operably connected with the driving gear 12a to be driven thereby through gears 17 and 17a which are changeable for different speeds in the usual manner. This shaft extends through the carriage 15 and is in operable connection with suitable mechanism (not shown) provided within the carriage for moving the carriage longitudinally. A hand wheel 18 and suitable mechanism (not shown) are provided for manually moving the carriage longitudinally. A cross slide 19 is slidably mounted on the carriage 15 and is adapted for movement transversely of the lathe. A transverse feed screw 20 is mounted on the carriage and extends through the cross slide and is in operable engagement therewith, so that rotation of the feed screw will effect the transverse movement of the cross slide. The shaft 20 is adapted for operable connection with the shaft 16 for rotation thereby, that is by power from the motor 9. A hand crank 21 is secured to the shaft 20 for manually rotating this shaft.

All of the foregoing parts are of usual design and operation and it will of course be understood that they are so adapted that the motive power may be cut in or out at will so that the carriage 15 may be moved longitudinally and the cross slide 19 may be independently moved transversely either by power or manually as desired.

Coming now to the present invention, a speical reciprocating tool holder block 22 is slidably mounted on the cross slide 19 for movement longitudinally of the lathe relative thereto. Hereinafter wherever the words "longitudinally" and "transversely" are used they will be understood to be used with reference to the lathe. A longitudinal slot 23 is formed in the block 22. A guide piece 24 is disposed within the slot 23 and secured by studs 25 to the cross slide 19. The guide piece 24 includes flanges at its upper edge which overlap the block. The block 22 is thus permitted longitudinal movement relative to the cross slide but is firmly held against vertical or lateral movement relative thereto. A cutting tool 26 is secured by a screw 27 in a jaw 28 which is formed at the left end of the block 22. The tool is transversely moved with the cross slide. Reciprocating longitudinal motion is given to the block 22 in a manner presently to appear. A jaw 29 hereinafter further described is formed on the right end of the block 22.

A transverse slot 28a is formed in the block 22 at the inner end of the jaw 28 and a wedge 28b is operably disposed within the slot and adapted for movement therein transversely of the block to longitudinally adjust the tool 26 for successive cuts as will be hereinafter further described. Suitable mechanical means (not shown) for adjusting the wedge or other suitable means for longitudinally adjusting the tool may of course be provided.

At the right end of the lathe a bed plate 30 is mounted on the frame structure 8. The bed plate is adjustable longitudinally of the lathe on guides 1a provided on the frame structure and suitable clamping means indicated generally by the numeral 30a are provided for securing the plate to the frame structure at any desired longitudinal position.

Two vertical columns 31 are rigidly secured to lugs 31a formed integrally with the bed plate 30, one at each side thereof, the lower portions of the columns passing through the lugs and securing nuts 31b being provided at their lower ends. The columns shown in the preferred embodiment are cylindrical but it will of course be understood that they may be of any suitable cross-sectional shape provided their lugs and the parts slidingly engaged therewith hereinafter described are correspondingly shaped and that the columns may be carried by the bed plate in any suitable manner.

A cross rail 32 extends between the columns 31 and a hollow bearing 33 is integrally formed on each end of this rail. Each bearing 33 slidably engages an adjacent column 31 adapting the cross rail for vertical sliding movement on the columns. The left face of the cross rail 32 is provided with a horizontal T-shaped groove 34 in which is fitted a T-shaped portion 35a of a travelling jaw or knuckle-joint head 35. A feed screw 36 extends through the groove 34 and is provided at its opposite ends with suitable bearings formed on the sides of the bearings 33. The T-shaped portion 35a is provided with a threaded opening 35b, and the feed screw 36 extends through this opening in threaded engagement therewith so as to impart, upon its rotation, transverse movement of the head. The purpose of the knuckle-joint head will be hereinafter explained.

A bevel gear 37 is secured on the end of the feed screw 20 at the rear side of the lathe and a bevel gear 38 in mesh with the gear 37 is mounted in a suitable bearing 39 which is secured on the carriage 15. A longitudinal shaft 40 extends through the hub of the bevel gear 38 in slidable spline engagement therewith. A bevel gear 41 is secured on the right end of the shaft 40 and this end of the shaft is mounted in a suitable bearing 42 which is carried on the bed plate 30 at the rear side of the lathe. A vertical shaft 43 is mounted at its lower end in a suitable bearing 44 which is also carried on the bed plate 30 adjacent the bearing 42. A bevel gear 45 is secured on the shaft 43 in mesh with the gear 41. A bevel gear 46 is secured on the end of the feed screw 36 at the rear side of the lathe and a bevel gear 47 in mesh with the gear 46 is mounted in a suitable bearing 48 which is formed on the bearing 33 at the rear side of the lathe. The shaft 43 extends through the hub of the bevel gear 47 and is in slidable spline engagement therewith. The feed screw 20 and the feed screw 36 are reversely threaded and of equal pitch and the bevel gears just described are so proportioned that the same amount of transverse feed or movement in the same direction will be given to the head 35 as is given to the cross slide 19 carrying the tool 26.

A pedestal 49 is mounted on the right end of the bed plate 30. A bearing 50 is formed in the upper end of the pedestal and a longitudinal spline shaft 51 is journalled at its left end in the bearing 50. The left end of the shaft 51 is formed integral with the hub of a crank disc or wrist pin plate 52 hereinafter further described. A gear 54 is mounted in a bearing 53 which is carried on a pedestal 53a secured on the right end of the frame structure 8. The shaft 51 extends through the hub of the gear 54 in slidable spline engagement therewith.

A longitudinal shaft 55 is mounted in suitable bearings 55a carried on the frame structure at the rear side of the lathe, one at each end thereof. A gear 56 is mounted on the left end of the shaft 55 and is operably connected by gears 12, 12a, and 17a hereinbefore mentioned, with the motor 9. A gear 58 is mounted on the right end of the shaft 55 and is operably connected through a gear 59 to the gear 54. The gear 54, the gears connecting the shaft 55 and the motor 9, and the gears connecting the shaft 55 and the gear 54 are so proportioned that the shaft 51 will be rotated at exactly the same rate of speed as the chuck 11 which rotates the nozzle 2. The axis of the shaft 51 is in alignment with the axis of the spindle 11a.

A T-shaped slot 60 is provided across the left face of the wrist pin plate 52. The slot 60 passes through the center of the wrist pin plate and hence across the center line of the shaft 51. A T-shaped wrist pin block 61 is slidably mounted in the slot 60. A feed screw 62 extends through the slot 60 and is suitably mounted at its opposite ends in bearings 62a which are formed in the wrist pin plate 52. The part of the block 61 which is within the slot 60 is provided with a threaded opening 63 and the feed screw extends through this opening in threaded engagement therewith so that rotation of the feed screw will effect movement of the block 61 in the slot 60 diametrically of the wrist pin plate.

A star wheel 64 is keyed to an end of the feed screw 62 which projects beyond the wrist pin plate 52 at one side thereof. A stud 65 is secured on a bracket 66 which is carried on the front side of the pedestal 49 at the right end of the wrist pin plate in such position that a tooth of the star wheel will strike it and the star wheel will be turned thereby one step at each revolution of the wrist pin plate. A second bracket 66a is carried on the front side of the bed plate 30 at the left end of the wrist pin plate. The stud 65 is removable and is adapted to be secured in the upper end of the bracket 66a in such position as to effect reverse movement of the feed screw by virtue of the striking of a tooth of the star wheel against the stud at the opposite side of its axis. It will of course be understood that where it proves more convenient brackets for the stud 65 may be provided at the rear side of the lathe at the right and left ends of the wrist pin plate in place of the brackets 66 and 66a.

A wrist pin 67 is integrally formed on the left end of the wrist pin block 61. A horizontal slot 68 is formed in the right end face of the cross rail 32. The wrist pin 67 extends into the slot 68. It will be apparent that the angularity of the wrist pin 67 above or below the horizontal center plane through the shaft 51 will determine the position of the cross rail 32 above or below the same center plane.

A connecting rod or radius bar 69 which extends longitudinally of the lathe is connected at its left end by a pin 70 to the jaw 29 on the tool holder block 22. The right end of the radius bar 69 is pivotally connected by a pin 71 to a jaw 35c integrally formed on the knuckle-joint head 35.

For any particular piece of work the radius bar used must conform exactly in distance from the center of the pin 70 to the center of the pin 71 to the radius required for the cylindrical curved face 7 to be machined. The radius bar 69 is therefore adapted for adjustable length so that cylindrical faces of different radii may be machined. More specifically the radius bar is made in two separate pieces 69a and 69b with the adjacent ends of these pieces threaded, one being a right hand thread and the other a left hand thread, and a correspondingly threaded turnbuckle 73 is applied thereto. Suitable lock nuts 74 are provided on the pieces 69a and 69b at the ends of the turnbuckle.

A counterweight 75 is provided at the right end of the lathe. The counterweight is connected by a clevis 76 to a pulley 77. Two sheaves 78 are mounted in bearings 78a, which are suitably secured to a roof girder 78b, one at each side of the lathe center line above the pulley 77 and two sheaves 79 are mounted in bearings 79a which are carried on the upper ends of the columns 31. A cable 80 is secured at one of its ends to one of the bearings 33 of the cross rail 32 and extends over the adjacent sheave 79 to the right and over the sheave 78 at that side of the lathe, thence under the pulley 77 and up over the other sheave 78 and to the left over the sheave at the other side of the lathe. The cable then extends downwardly and is attached at this end to the bearing 33 at the other end of the cross rail. The counterweight 75 serves to balance the weight of the cross rail 32 and parts movable vertically therewith on the columns 31.

In the present embodiment the cross feed screw 20 and the feed screw 62 are given the same pitch, and as the wrist pin plate 52, which is a factor in controlling the speed of the screw 62, revolves at the same speed as the chuck 11, which bears a constant relation to the speed of the screw 20, the desired equal movement of the tool holder and the wrist pin block 61 is provided by forming the star wheel 64, which is the other factor in controlling the speed of the screw 62, with a suitable number of teeth. Thus as the tool 26 is moved toward or away from the center line of the nozzle, the wrist pin block is simultaneously moved an equal amount toward or away from the center line of the shaft 51, and it will be apparent that as the tool approaches the center line of the nozzle there will be a gradually less amount of reciprocation of the tool.

There will preferably be a mark on the outside shell of the chuck 11 which will be in a horizontal radial plane when the wrist pin 67 is in a horizontal radial plane at either the front or back horizontal dead center position, and in preparing the nozzle for chucking, a mark will be made on the outside cylindrical surface of its flange 5 which will match with the extreme depth position of the hollow required on the curved surface. The nozzle will be secured to the chuck in such position that its match mark will be in the same radial plane as the mark on the chuck. The radius bar is then in longitudinal horizontal position, the mark on the nozzle being opposite the point where the cutting edge of the tool 26 is disposed for starting.

In the operation of a lathe embodying the present invention the nozzle 2 will be secured in the chuck 11 in the manner aforedescribed, and the radius bar 69 will be adjusted for the length of the desired radius of the curved surface 7 to be machined, the bed plate 30 being free to slide longitudinally during this adjustment. The lathe mechanism will then be operated to turn the wrist pin plate 52 until the wrist pin block 61 is brought to either the front or back horizontal dead center position thus bringing the cross rail 32 to midposition of its vertical path of movement or stroke and simultaneously bringing the connecting pins 70 and 71 of the radius bar level with each other, that is, bringing the radius bar to a longitudinal horizontal position. The wrist pin, radius bar and the marks on the chuck and the flange are then in the same horizontal plane and the cutting edge of the tool is also disposed in this same plane.

The power driving connections to the mechanism of the carriage 15 will be thrown out of engagement in the usual manner and the hand crank 21 will be rotated so as to move the cross slide 19 and consequently the tool holder and tool to a position at a distance from the center line 14—14 of the chuck equal to the radius of the flange 5. This same operation will move the center line of the knuckle-joint head 35 correspondingly, by means of the connecting gear mechanism as aforedescribed. Thereupon the bed plate with its associated parts is moved to the left to bring the tool in cutting position and the bed plate 30 is then secured. Simultaneously with the movement of the bed plate 30, the carriage 15 is moved if necessary to permit the final positioning of the tool and further is so adjusted as to permit the longitudinal movements of the tool holder during operation. The carriage 15 is then fixed in this position. The stud 65 will be removed so as not to mesh with the star wheel 64 and the wrist pin block 61 will then be moved manually by turning the star wheel until the wrist pin is set at a starting position a distance away from the center line or axis of the shaft 51 also equal to the radius of the flange 5. The stud 65 will then be inserted in the bracket 66 to feed the wrist pin block toward the axis of the shaft 51 at each revolution of the wrist pin plate 52 by the engagement of the stud 65 with the star wheel as aforedescribed. The cutting tool is then secured in its final position in the holder for the full depth of the first cut required and the power driving connections for the cross feed are again engaged and the usual automatic operation of the machine is started.

In the drawings the lathe is shown in starting position and in operation the spindle and wrist pin will be operated in a counter-clockwise direction as viewed from the right. By starting with the match mark on the flange 5 opposite the cutting edge of the tool 26, and with the tool at the outer circumference of this flange, on the first cut, when the nozzle 2 has been rotated a quarter turn, the first high point of the curved surface 7 will have reached the cutting edge of the tool. If the start of the rotation has been made with the wrist pin 67 at the rear dead center position shown in Fig. 2, the radius bar pin 71 will have reached its uppermsot position at the same time as the first high point of the surface 7 reaches the cutting edge of the tool. By means of the radius bar 69 the tool holder will have been withdrawn the exact amount required to bring the cutting edge of the tool to the right a distance equal to the distance that the high points of the curved face 7 are to be away from the low points, axially of the nozzle.

Upon the next quarter turn of the nozzle the other low point on the flange 5 which is diametrically opposite the starting mark will reach the cutting edge of the tool. The radius bar pin 71 will then have dropped to midposition as the wrist pin will have travelled over to its front dead center position and the tool holder will have travelled to the left the same distance as it was withdrawn to the right on the first quarter turn. Similarly for the remaining half turn of the nozzle to the position where its match mark again reaches the cutting edge of the tool, the aforedescribed double motion of the tool will be exactly repeated, with the wrist pin working in the 180 degree arc below the horizontal center line, thereby finishing the first complete revolution.

With the successive cuts as they progress in an inward direction (toward the axis of the nozzle) from the outer circumference of the face 7, upon each subsequent in-feed increment of the cutting tool it is necessary that the tool advance a slightly less distance to the right (a shorter reciprocation) by the time the nozzle has turned 90 degrees to the high point on the surface 7. This control of the longitudinal motion of the tool is properly effected by the shortening of the stroke of the radius bar pin 71 which is effected by the automatic shortening of the working radius of the wrist pin 67 at each upstroke of the wrist pin by the action of the feed screw 62 which is rotated the necessary amount upon the engagement of the star wheel 64 with the stud 65. This action of the star wheel takes place when the wrist pin is passing one of its horizontal dead center positions, i. e., at a time when the tool is changing its direction of movement thereby ensuring smooth operation of the tool.

It will thus be apparent that for all positions of rotation of the flange 5 the cutting point of the tool will always be at the correct longitudinal position and this will hold true for all transverse positions of the tool.

When the tool has travelled until it has crossed the entire width of the face to be machined or as in the present instance until it has reached the cylindrical projecting neck 6, the lathe is stopped with the starting mark on the flange 5 in the same horizontal plane as the tool. The tool is advanced to the left for the next cut (by means of the wedge 28b hereinbefore mentioned or such other suitable adjusting mechanism as is provided therefor), the cross feed mechanism of the carriage 15 is adjusted for reverse operation and the stud 65 is changed from the bracket 66 to the bracket 66a so as to cause the star wheel and its feed screw to rotate in an opposite direction and thus feed the wrist pin outwardly. The face 7 will be thereupon machined by an out-feed of the tool in similar manner to the in-feed operation aforedescribed.

In Figs. 8 to 11 there is illustrated an engine lathe embodying the present invention, similar to the lathe shown in Figs. 1 to 7, but with certain of the parts embodying this invention in modified form. Except for the changes hereinafter pointed out all of the parts and the operation of the lathe shown in Figs. 8 to 11 are the same as those of the first described lathe.

Here the radius bar 69 of the first described lathe which is adapted for transverse movement with the cutting tool is replaced by two radius bars 81 which do not have transverse movement. Two transversely spaced jaws 82 are secured to a cross rail 83 which corresponds to the cross rail 32. The radius bars 81 are pivotally connected at their right ends one to each of the jaws 82 and at their left ends are pivotally connected one to each of two jaw parts 84 which are formed on cross heads 85. The radius bars 81 are of the same two-part construction as the radius bar 69. The crossheads 85 are connected by an integrally formed transverse member 86 and are slidably engaged with guides indicated at 87 which are carried on the carriage 15a. The lower part of a T slot which is indicated as a whole by the numeral 88 is formed in the transverse member 86 and crossheads 85. A transverse plate 89 is secured by studs 90 to the crossheads 85 and is shaped to provide the upper part of the T slot 88. A T-shaped piece 91 is integrally formed on the right end of the tool holder block 22a and is slidably fitted into the T slot 88. It will be apparent that by this arrangement the parts, including the various shafts and gears, provided in the first described lathe for transversely moving the knuckle-joint head 35 are eliminated.

This lathe also is provided with a modified form of counterweight, in place of the counterweight 75 of the first described lathe. Here two fulcrum bearings 92 are supported one on each of two fulcrum supports 93 one of which supports is disposed at each side of the bed plate 30 at the right end thereof. Each support comprises a substantially horizontal arm 94 supportably secured at its left end to the top of one of the columns 31 and an arm 95 extending downwardly from the right end of the arm 94 and suitably secured to the bed plate 30. The counterweight structure indicated generally by the numeral 96 is formed as an integral casting and includes a weight portion 97 and a lever 98. A fulcrum bearing 99 is formed in the lever and is connected by an arm member 100 to the weight portion 97. Two arm members 101 of the lever extend to the left from the fulcrum bearing 99. A shaft 102 is passed through the bearings 99 and 92, a pivotal or fulcrum connection being thereby provided for the counterweight. The left end of each arm member 101 is pivotally secured to an upper end of a link 103 and the lower end of each link 103 is in turn pivotally secured to the bearing 33a on the cross rail 83 at its respective side of the lathe. It will be obvious that the weight portion 97 will serve to counterbalance the weight of the cross rail 83 and the parts carried thereby.

Among the essential parts of the invention are a rotating spindle and a transversely movable tool holder operably connected therewith and as these parts are present in an engine lathe the invention has been described in connection therewith. It is obvious however that other machines having similar parts may be substituted or an entirely new machine embodying only the necessary parts may be constructed.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; means for holding said tool adapted for reciprocating movement longitudinally of said apparatus and for transverse movement relative thereto; swingable means having pivotal connection with said tool holding means and being adapted to swing about said pivotal connection as a center; actuating means having operable connection with said swingable means in fixed spaced relation to said pivotal connection for swinging said swingable means about said pivotal connection by movement bodily of said operable connection; and means for operating said holding means, including means for operating said actuating means, operably connected with said spindle whereby upon rotation of said spindle said movements will be imparted to said holding means for effecting said machining by said cutting tool.

2. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; means for holding said tool adapted for reciprocating movement longitudinally of said apparatus and for transverse movement relative thereto; means operably connecting said holding means with said spindle to effect said transverse movement upon rotation of said spindle; swingable means having pivotal connection with said tool holding means and being adapted to swing about said pivotal connection as a center; actuating means having operable connection with said swingable means in fixed spaced relation to said pivotal connection for swinging said swingable means about said pivotal connection by movement bodily of said operable connection; and means operably connecting said actuating means with said spindle to effect said reciprocating movement and vary the longitudinal extent thereof a predetermined amount relative to the amount of said transverse movement upon said rotation of said spindle, whereby said machining will be effected by said cutting tool.

3. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; means for holding said tool adapted for reciprocating movement longitudinally of said apparatus and for transverse movement relative thereto; means operably connecting said holding means with said spindle to effect said transverse movement upon rotation of said spindle; swingable means having pivotal connection with said tool holding means and being adapted to swing about said pivotal connection as a center; actuating means having operable connection with said swingable means in fixed spaced relation to said pivotal connection for swinging said swingable means about said pivotal connection by movement bodily of said operable connection; and means operably connecting said actuating means with said spindle to effect said reciprocating movement at the rate of two reciprocations for each rotation of said spindle and to vary the longitudinal extent of said reciprocating movement a predetermined amount relative to the amount of said transverse movement upon said rotation of said spindle, whereby said machining will be effected by said cutting tool.

4. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; means for holding said tool adapted for reciprocating movement longitudinally of said apparatus and for transverse movement relative thereto; means operably connecting said holding means with said spindle to effect said transverse movement in successive increments upon successive rotations of said spindle; swingable means having pivotal connection with said tool holding means and being adapted to swing about said pivotal connection as a center; actuating means having operable connection with said swingable means in fixed spaced relation to said pivotal connection for swinging said swingable means about said pivotal connection by movement bodily of said operable connection; and means operably connecting said actuating means with said spindle to effect said reciprocating movement at the rate of two reciprocations for each rotation of said spindle and to successively vary the longitudinal extent of said reciprocating movement a predetermined amount for each of said successive increments, whereby said machining will be effected by said cutting tool.

5. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; means for holding said tool adapted for reciprocating movement longitudinally of said apparatus and for transverse movement relative thereto; means operably connecting said holding means with said spindle to effect said transverse movement toward and away from said axis of said spindle upon rotation of said spindle; swingable means having pivotal connection with said tool holding means and being adapted to swing about said pivotal connection as a center; actuating means having operable connection with said swingable means in fixed spaced relation to said pivotal connection for swinging said swingable means about said pivotal connection by movement bodily of said operable connection; and means operably connecting said actuating means with said spindle to effect said reciprocating movement and vary the longitudinal extent thereof proportionately to the transverse distance of said holding means from said axis of said spindle upon rotation of said spindle, whereby said machining will be effected by said cutting tool.

6. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; means operably connecting said cross slide with said spindle to effect said transverse movement upon rotation of said spindle; swingable means having pivotal connection with said tool holding means and being adapted to swing about said pivotal connection as a center; actuating means having operable connection with said swingable means in fixed spaced relation to said pivotal connection for swinging said swingable means about said pivotal connection by movement bodily of said operable connection; and means operably connecting said actuating means with said spindle to effect said reciprocations upon said rotation of said spindle, whereby said machining will be effected by said cutting tool.

7. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; radius bar means having an end pivotally connected with said holder; actuating means for said radius bar means connected therewith at the opposite end thereof and adapted for reciprocating movement perpendicularly to the direction of said reciprocations of said holder; means operably connecting said cross slide with said spindle to effect said transverse movement upon rotation of said spindle; and means operably connecting said actuating means with said spindle to effect said reciprocating movement of said actuating means and said reciprocations of said holder upon rotation of said spindle, whereby said machining will be effected by said cutting tool.

8. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; longitudinally adjustable radius bar means having an end pivotally connected with said holder and adapted for longitudinal movement therewith; actuating means for said radius bar means connected therewith at the opposite end thereof and adapted for reciprocating movement perpendicularly to the direction of said reciprocations of said holder; means operably connecting said cross slide with said spindle to effect said tranverse movement upon rotation of said spindle; and means operably connecting said actuating means with said spindle to effect said reciprocating movement of said actuating means and thereby effect said reciprocations of said holder and to vary the longitudinal extent thereof in predetermined amounts relative to the amounts of said transverse movement of said cross slide upon said rotation of said spindle, said extent being initially adjustable by longitudinal adjustment of said radius bar means, whereby said machining will be effected by said cutting tool.

9. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; radius bar means having an end pivotally connected with said holder and adapted for longitudinal movement therewith; actuating means for said radius bar means including a vertically movable member pivotally connected with the other end of said radius bar means and means for counterbalancing the weight of said member; means operably connecting said cross slide with said spindle to effect said transverse movement upon rotation of said spindle; and means operably connecting said member with said spindle to effect said vertical movement of said member in reciprocations to thereby effect said reciprocations of said holder upon said rotation of said spindle, whereby said machining will be effected by said cutting tool.

10. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; radius bar means having an end pivotally connected with said holder and adapted for longitudinal movement therewith; actuating means for said radius bar means including a member movable perpendicularly to the direction of said reciprocations of said holder and pivotally connected with the opposite end of said radius bar means, a rotatable crank pin plate, a crank pin carried by said plate radially movable relative thereto and operably engaging said member, and means operable by rotation of said plate for effecting radial movement of said pin away from and toward the axis of said plate; means operably connecting said cross slide with said spindle to effect said transverse movement upon rotation of said spindle; and means operably connecting said plate with said spindle to effect rotation of said plate at a predetermined rate relative to the rate of rotation of said spindle to thereby effect said reciprocations of said holder and to effect said radial movement of said pin in amounts corresponding to the amounts of said transverse movement to thereby vary the longitudinal extent of said reciprocations of said holder a predetermined amount relative to the amount of said transverse movement upon said rotation of said spindle, whereby said machining will be effected by said cutting tool.

11. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; radius bar means having an end pivotally connected with said holder and adapted for longitudinal movement therewith; actuating means for said radius bar means including a member movable perpendicularly to the direction of said reciprocations of said holder and pivotally connected with the opposite end of said radius bar means, a rotatable crank pin plate, a crank pin carried by said plate radially movable relative thereto and operably engaging said member, and means for effecting radial movement of said pin away from and toward the axis of said plate comprising a feed screw carried by said plate and operably engaging said pin, a star wheel secured to said feed screw, and means disposed adjacent said plate whereby a tooth of said star wheel will be engaged thereby upon each revolution of said plate to effect turning of said feed screw and radial movement of said pin; means operably connecting said cross slide with said spindle to effect said transverse movement upon rotation of said spindle; and means operably connecting said plate with said spindle to effect rotation of said plate at a predetermined rate relative to the rate of rotation of said spindle to thereby effect said reciprocations of said holder and to effect movement of said star wheel and consequently said radial movement of said pin to thereby vary the longitudinal extent of said reciprocations of said holder a predetermined amount relative to the amount of said transverse movement upon rotation of said spindle, whereby said machining will be effected by said cutting tool.

12. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; a cross slide adapted for transverse movement relative to said axis of said spindle; a holder for said tool carried by said cross slide transversely movable therewith and slidably movable relative thereto in reciprocations longitudinally of said apparatus; longitudinally adjustable radius bar means having an end pivotally connected with said holder and adapted for longitudinal movement therewith; actuating means for said radius bar means connected therewith at the opposite end thereof and adapted for reciprocating movement perpendicularly to the direction of said reciprocations of said holder; means operably connecting said cross slide with said spindle to effect said transverse movement upon rotation of said spindle; and means operably connecting said actuating means with said spindle to effect said reciprocating movement of said actuating means in reciprocations at a rate equal to the rate of rotations of said spindle to thereby effect said reciprocations of said holder at a rate equal to two for each rotation of said spindle upon said rotation of said spindle, said actuating means being adapted to vary the longitudinal extent of said reciprocations of said holder in predetermined amounts relative to the amounts of said transverse movement of said cross slide, whereby said machining will be effected by said cutting tool.

13. An apparatus for machining work for forming a cylindrical surface thereon or for finishing a cylindrical surface preformed thereon, comprising a rotatable spindle or the like having an axis extending longitudinally of said apparatus; means for securing said work to said spindle for rotation therewith whereby the axis of said surface will pass through the axis of said spindle at a right angle thereto; a cutting tool for machining said surface; means for holding said tool adapted for reciprocating movement longitudinally of said apparatus and for transverse movement relative thereto; means longitudinally spaced from said holding means; means for connecting said spaced means with said holding means; means for reciprocating said spaced means in predetermined directions and through distances varying by successive increments with each of its successive reciprocations, said reciprocating producing means being adjustable to vary the magnitude of said distances in correspondence with the diameter of said surface to be machined whereby said reciprocations of said holding means will be effected; means for operatively connecting said spaced means with said spindle; and means for operatively connecting said holding means with said spindle for imparting said transverse movement to said holding means during said reciprocations of said holding means, whereby a machining cut will be made upon said cylindrical surface.

14. An apparatus for machining work, comprising a cutting tool; a rotatable means for supporting the work with the surface thereof to be machined opposite said tool with at least a portion of said surface extending in a direction toward said tool; means for moving said tool in a direction axially of said rotatable means, thereby adapting said tool for engagement with said surface portion including a swingable means having a pivotal connection with said tool, said swingable means being adapted to swing about said pivotal connection as a center; and means having operable connection with said swingable means in fixed spaced relation to said pivotal connection for swinging said swingable means about said pivotal connection by movement bodily of said operable connection.

15. An apparatus for machining work, comprising a cutting tool; a rotatable means for supporting said work with a side thereof opposite said tool whereby a surface can be cut thereon having at least a portion thereof extending in a direction toward said tool; means for moving said tool in a direction axially of said rotatable means, thereby adapting said tool for engagement with said surface portion, including a swingable means having a pivotal connection with said tool, said swingable means being adapted to swing about said pivotal connection as a center; and means having operable connection with said swingable means in fixed spaced relation to said pivotal connection for swinging said swingable means about said pivotal connection by movement bodily of said operable connection.

NELS E. FLODIN,
EMMA B. ECKFELDT,
*Executrix of the Last Will and Testament of John J. Eckfeldt, Deceased.*